(12) United States Patent
King et al.

(10) Patent No.: US 10,167,920 B2
(45) Date of Patent: Jan. 1, 2019

(54) ADJUSTABLE DAMPING CURVE SHOCK ABSORBER

(71) Applicant: Viking Performance, Inc., Lakeville, MN (US)

(72) Inventors: Christopher J. King, Apple Valley, MN (US); Jacob A. Neuman, Lakeville, MN (US)

(73) Assignee: Viking Performance, Inc., Lakeville, MN (US)

( * ) Notice: Subject to any disclaimer, the term of this patent is extended or adjusted under 35 U.S.C. 154(b) by 1 day.

(21) Appl. No.: 15/374,411

(22) Filed: Dec. 9, 2016

(65) Prior Publication Data

US 2017/0167562 A1 Jun. 15, 2017

Related U.S. Application Data

(60) Provisional application No. 62/265,750, filed on Dec. 10, 2015.

(51) Int. Cl.
| | |
|---|---|
| *F16F 9/44* | (2006.01) |
| *F16F 9/22* | (2006.01) |
| *F16F 9/32* | (2006.01) |
| *B60G 13/06* | (2006.01) |
| *F16F 9/18* | (2006.01) |

(52) U.S. Cl.
CPC ............... *F16F 9/44* (2013.01); *B60G 13/06* (2013.01); *F16F 9/22* (2013.01); *F16F 9/3214* (2013.01); *B60G 2202/24* (2013.01); *F16F 9/185* (2013.01); *F16F 2230/186* (2013.01); *F16F 2232/08* (2013.01); *F16F 2238/04* (2013.01)

(58) Field of Classification Search
CPC .... F16F 9/44; F16F 9/22; F16F 9/3214; F16F 2230/186; F16F 2232/08; F16F 2238/04; B60G 13/06
See application file for complete search history.

(56) References Cited

U.S. PATENT DOCUMENTS 2,011,460 A * 8/1935 Snyder ...................... F16F 9/22
188/285
4,709,791 A * 12/1987 Houghton ............... F16F 9/003
137/901

(Continued)

FOREIGN PATENT DOCUMENTS

GB 792868 * 4/1958

*Primary Examiner* — Vishal R Sahni
(74) *Attorney, Agent, or Firm* — Grossman, Tucker, Perreault & Pfleger, PLLC (57) ABSTRACT

An adjustment control for adjusting a damping curve of a shock absorber includes an aperture seat coupled to a base of the shock absorber. The aperture seat defines a flow tube. A plug, in mechanical communication with a spring, slidably engages the flow tube. A plug nut is threadably coupled to an adjustment nut shaft stud and is in mechanical communication with the spring. An adjustment nut is coupled to the base. The adjustment nut has a non-circular cavity to receive at least a portion of the adjustment nut shaft stud and at least a portion of the non-circular region of the plug nut such that the plug nut cannot rotate relative to the non-circular cavity of the adjustment nut. An adjustment knob causes rotation of the adjustment nut shaft stud. The rotation of the adjustment nut shaft stud causes axial movement of the plug nut.

12 Claims, 6 Drawing Sheets

(56) References Cited

U.S. PATENT DOCUMENTS

| | | | |
|---|---|---|---|
| 4,850,460 | A | 7/1989 | Knight et al. |
| 6,276,499 | B1 | 8/2001 | Satou et al. |
| 6,655,512 | B2 | 12/2003 | Moradmand et al. |
| 7,055,661 | B2 | 6/2006 | Bertrand et al. |
| 7,128,192 | B2 | 10/2006 | Fox et al. |
| 8,424,832 | B2 * | 4/2013 | Robbins ................. B60N 2/501 180/167 |

* cited by examiner

ADJUSTABLE DAMPING CURVE SHOCK ABSORBER

CROSS-REFERENCE TO RELATED APPLICATIONS

The present application claims the benefit of U.S. Provisional Patent Application Ser. No. 62/265,750 filed Dec. 10, 2015, which is fully incorporated herein by reference.

FIELD

The present disclosure is generally related to shock absorbers, and particularly to hydraulic shock absorbers which can have their damping curve adjusted, either in compression, rebound (expansion), or both.

BACKGROUND

Numerous different types of hydraulic shock absorbers are known, such as those disclosed in U.S. Pat. Nos. 4,850,460, 6,276,499, 6,655,512, 7,055,661 and 7,128,192, each incorporated herein by reference. These various patents and other known shock absorbers teach the importance of the damping curve (force versus speed of shock movement) provided by the shock absorber as it affects the performance of the vehicle. Many shock absorbers require disassembly of the shock absorber to make desired adjustments to the damping performance. Some shock absorbers include external controls which allow adjustment to the damping performance of the shock absorber (for example, only to the slope of the damping curve). Additionally, the external controls may be provided for the compression damping separately from the rebound (expansion) damping, commonly referred to as "double adjustable" shocks. For instance, Viking Performance, Inc. of Lakeville, Minn. offers a full line of shock absorbers having two rotary control knobs each with 19 different rotational positions (a total of 361 valve combinations).

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1A:
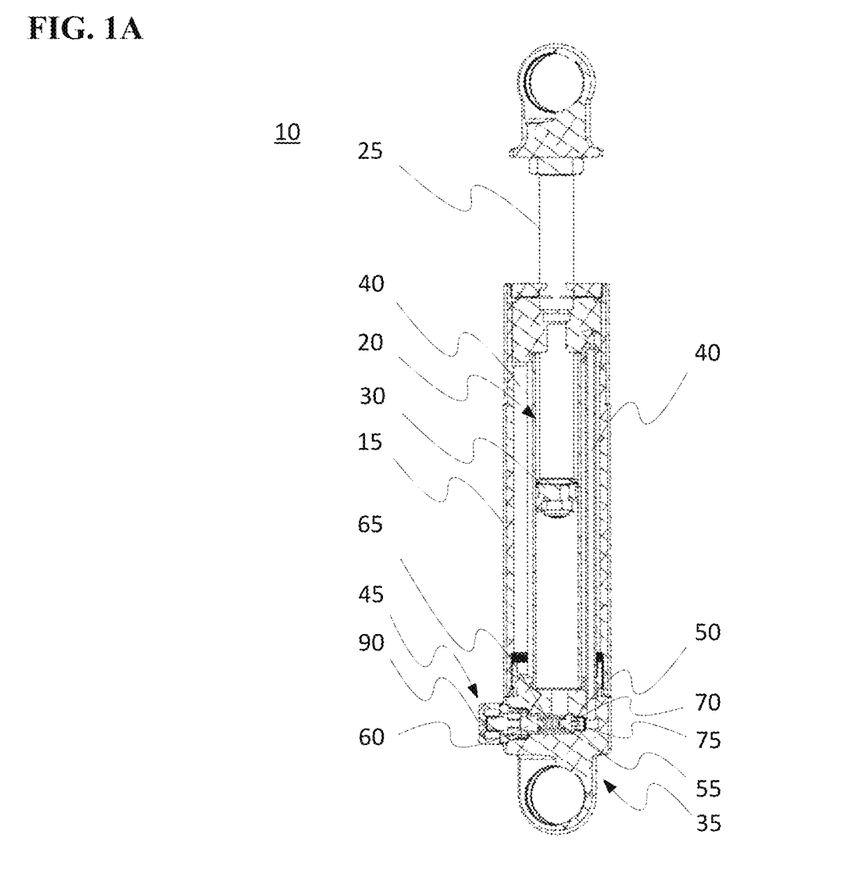
FIG. 1A generally illustrates a cross-sectional view of an embodiment a shock absorber.
Figure 1B:
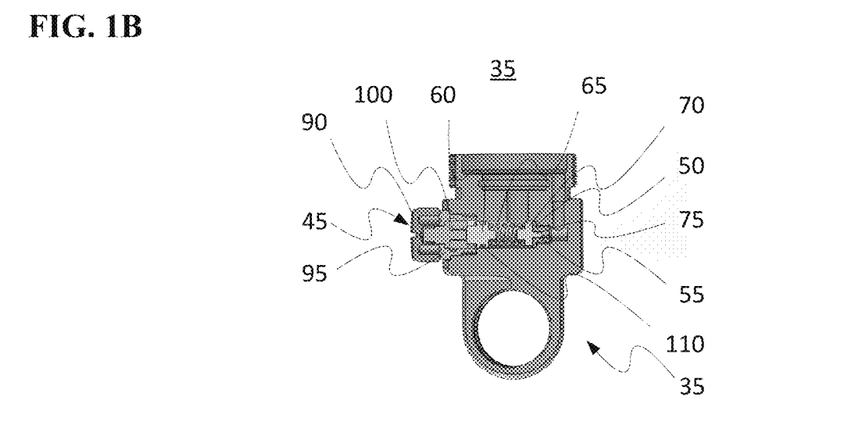
FIG. 1B generally illustrates a cross-sectional view an embodiment of a base assembly of a shock absorber.
Figure 2:
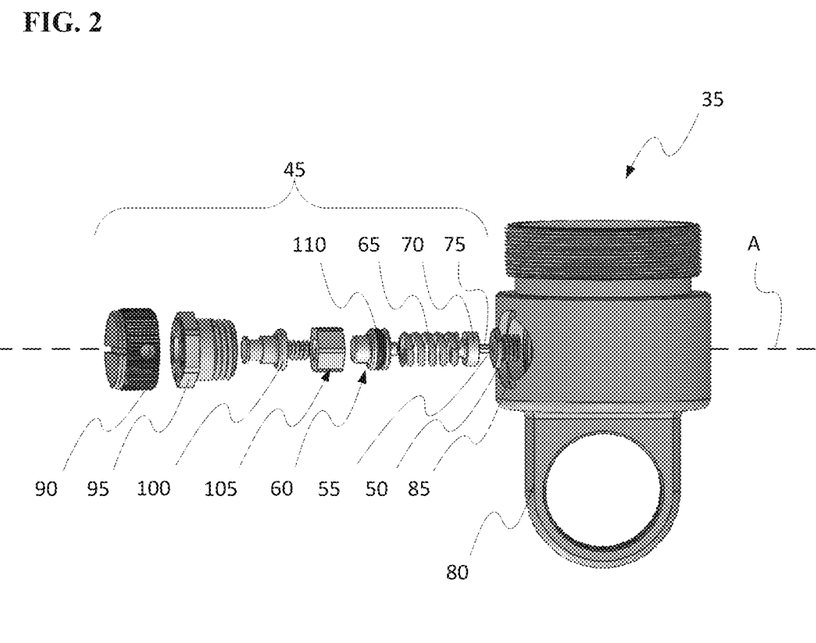
FIG. 2 generally illustrates an exploded view of an embodiment of a base assembly for a shock absorber having an adjustment control.
Figure 3:
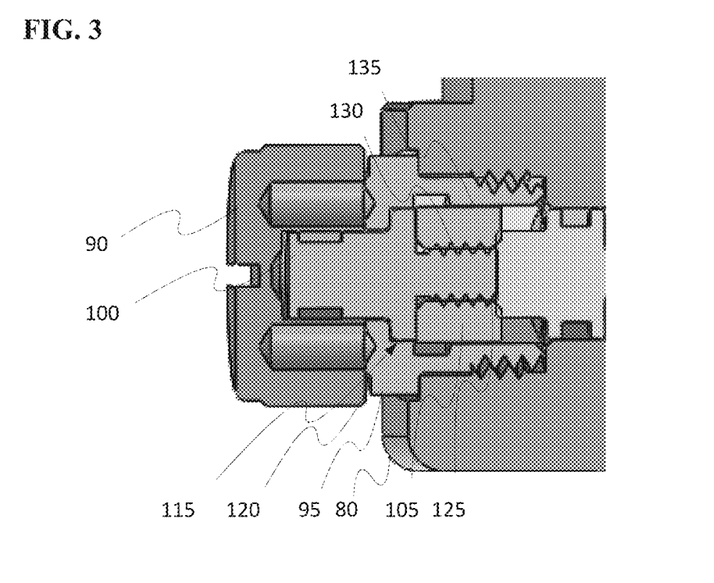
FIG. 3 generally illustrates a cross-sectional view of an embodiment of an adjustment knob's interaction with an adjustment mechanism in a base assembly for a shock absorber.

Turning now to FIGS. 1-3, and as shown in FIGS. 1A-1B, a cross-sectional view of a shock absorber 10 consistent with one embodiment of the present disclosure is generally illustrated. The shock absorber 10 may include a shock body 15 defining at least one piston cavity 20. A moveable shaft 25 including a shock piston 30 is moveably disposed within the piston cavity 20. A base assembly 35 may be coupled to one end of the shock body 15 and include one or more adjustment controls 45. While the base assembly 35 is shown as being removable from the shock body 15, it should be appreciated that the base assembly 35 may be integrally formed from the shock body 15. As may be appreciated, one or more fluids (including, but not limited to, liquids (e.g., hydraulic fluid) and/or gases (e.g., nitrogen)) may be disposed within the piston cavity 20 and rebound/compression chambers 40.

By way of a general overview, and as explained herein, one embodiment of the adjustment control(s) 45 allows a user to easily adjust the damping curve (e.g., the compression and/or rebound (expansion)) of the shock absorber 10 by controlling the flow rates of the fluid through an aperture seat 50 having a flow tube 55. In one embodiment, adjusting the damping curve involves using the adjustment control(s) 45 to advance an adjuster 60 against a spring 65. The spring 65 exerts a compressive force on a plug body 70 causing a plug 75 of the plug body 70 to engage (e.g., engage against) the flow tube 55 of the aperture seat 50. As the adjuster 60 advances, the compressive force exerted by the spring 65 on the plug body 70 increases and biases the plug 75 into the flow tube 55 of the aperture seat 50 (inversely, as the adjuster 60 retracts, the compressive force exerted by the spring 65 on the plug body 70 decreases). When the shock absorber 10 is compressed or expanded (rebounding), the fluid will flow into a corresponding one of the rebound/compression chambers 40. A distal end of the rebound/compression chamber 40 is fluidly coupled to the flow tube 55 of the aperture seat 50. When the hydraulic force(s) of the fluid in the piston cavity 20 exceeds the compressive force exerted by the spring 65, the plug 75 begins to disengage the flow tube 55 of the aperture seat 50. When the plug 75 fully disengages the flow tube 55, fluid freely flows through the flow tube 55.

An exploded view of one embodiment of the base assembly 35 is generally shown in FIG. 2. The base assembly 35 includes a base 80 having a bore 85 for receiving the components that form the adjustment control 45. The components of the adjustment control 45 may include an adjustment knob 90, an adjustment nut 95, an adjustment nut shaft stud 100, a plug nut 105, the adjuster 60, the spring 65, the plug body 70, and the aperture seat 50. In some embodiments the adjustment knob 90, the adjustment nut 95, the adjustment nut shaft stud 100, the plug nut 105, the adjuster 60, the spring 65, the plug body 70, and the aperture seat 50 are disposed on a common axis (e.g., along an axis A). However, other orientations are possible so long as the advancement/retraction of the plug nut 105 advances/retracts the plug 75 into/out of the flow tube 55 of the aperture seat 50. Further, in some embodiments, the plug nut 105 and the adjuster 60 are formed from an integral body. An O-ring 110 may be provided on the adjuster 60 such that the adjuster 60 seals to the base 80. In some embodiments, the aperture seat 50 may be mechanically coupled to the base 80. For example, a mechanical coupling may include a threaded coupling, an adhesive coupling, and/or an interference fit. In some embodiments, the shape of the of the aperture seat 50 may correspond to a removal tool (e.g., a wrench or a screw driver).

In operation, the plug 75 regulates the flow of fluid between the rebound/compression chamber 40 and the piston cavity 20 of the shock absorber 10. In some embodiments, the plug 75 fully seats in the flow tube 55 of the aperture seat 50 (i.e., the full length of the plug 75 has been received by the flow tube 55) when the shock absorber 10 is in a resting state (e.g., when connected to a stationary vehicle). In other embodiments, the plug 75 is not fully seated in the flow tube 55 (i.e., at least a portion of the plug 75 has not been received by the flow tube 55) when the shock absorber 10 is in a resting state. In embodiments where the plug 75 is not fully seated in the flow tube 55, fluid may flow through the flow tube 55 while the plug 75 is within the flow tube 55. As may be appreciated, such a configuration may serve to further alter the damping curve.

The rotation of the adjustment knob 90 is used to control the amount of compressive force exerted by the spring 65 on the plug body 70. When the compressive force exerted by the spring 65 exceeds the hydraulic force of the fluid in the piston cavity 20, the plug 75 remains (fully or partially) seated in the flow tube 55 of the aperture seat 50. As the hydraulic force begins to exceed the compressive force, the plug 75 begins to disengage the flow tube 55. However, as should be appreciated, as the plug 75 begins to disengage the flow tube 55 the compressive force exerted by the spring 65 increases. As such, if a seal is formed between the flow tube 55 and the plug 75, the fluid flow may be substantially prevented until the plug 75 fully disengages the flow tube 55. As a result, the shock absorber 10 will have a digressive damping and/or rebound curve. However, in some embodiments when the plug 75 partially disengages the flow tube 55 of the aperture seat 50, a controlled amount of fluid may pass through the flow tube 55 (i.e., a seal is not formed between the plug 75 and the flow tube 55). By allowing the fluid to pass through the flow tube 55 when the plug 75 is partially disengaged from the flow tube 55, it is possible to further alter the damping and/or rebound curve. To enable such a fluid flow, the plug 75 may have a shape/size that permits fluid to pass between the plug 75 and an inner surface of the flow tube 55. In other embodiments, the plug 75 may include at least one channel, which extends at least part of the length of the plug 75, that allows fluid to exit the flow tube 55 whenever a portion of the channel is outside of the flow tube 55.

The compressive force exerted by the spring 65 increases or decreases because rotation of the adjustment knob 90 simultaneously rotates the adjustment nut shaft stud 100. As the adjustment nut shaft stud 100 rotates, the adjustment nut shaft stud 100 engages the plug nut 105 so as to cause the plug nut 105 to advance or retract axially along the axis A, engaging the spring 65.

As shown in FIG. 3, the axial movement is facilitated by the adjustment nut shaft stud 100 being coupled to the adjustment knob 90 such that rotation of the adjustment knob 90 causes the rotation of the adjustment nut shaft stud 100 within a cavity 115 of the adjustment nut 95. The adjustment nut 95 is threadably coupled to the base 80 such that the adjustment nut 95 remains stationary relative to the adjustment nut shaft stud 100 when the adjustment knob 90 is rotated. To prevent the axial movement of the adjustment knob 90 and the adjustment nut shaft stud 100, the adjustment knob 90 rotates against a surface 120 of the adjustment nut 95.

As should be appreciated, rotation of the adjustment knob 90 causes the axial movement of the plug nut 105. Axial movement of the plug nut 105 is facilitated by a threaded portion 130 disposed on the adjustment nut shaft stud 100 which engages a corresponding threaded portion 125 on the plug nut 105. The plug nut 105 has an outer surface 135 that has a non-circular shape that engages a sidewall of the cavity 115 of the adjustment nut 95. This engagement prevents the plug nut 105 from rotating within the cavity 115 when the adjustment knob 90 is rotated. By preventing the plug nut 105 from rotating within the cavity 115 of the adjustment nut 95, the rotation of the adjustment nut shaft stud 100 causes the threads 130 of the adjustment nut shaft stud 100 to axially move the plug nut 105. As a result, the spring 65 is compressed/decompressed, increasing/decreasing the compressive force exerted on the plug body 70. According to one embodiment, the threaded connection between the adjustment nut shaft stud 100 and the plug nut 105 is reverse (left-hand) threaded. As such, clockwise rotation of the adjustment knob 90 causes the plug nut 105 to advance and counter-clockwise rotation of the adjustment knob 90 causes the plug nut 105 to retract.

As may be appreciated the above adjustment controls allow for infinite adjustability of the damping curve. However, most drivers and mechanics only need to understand that a particular setting and/or selection provides the ride characteristics that are desired for the vehicle. As such, infinite adjustability of the system may not be necessary. In some embodiments, the adjustment knob 90 may include one or more predefined locking points that correspond to a given damping curve. Each of these, predefined locking points may be indicated by an audible or tactile click. This allows a driver or mechanic to more easily obtain a desired and replicable setting across multiple shock absorbers using the adjustment control 45.

Figure 4A:
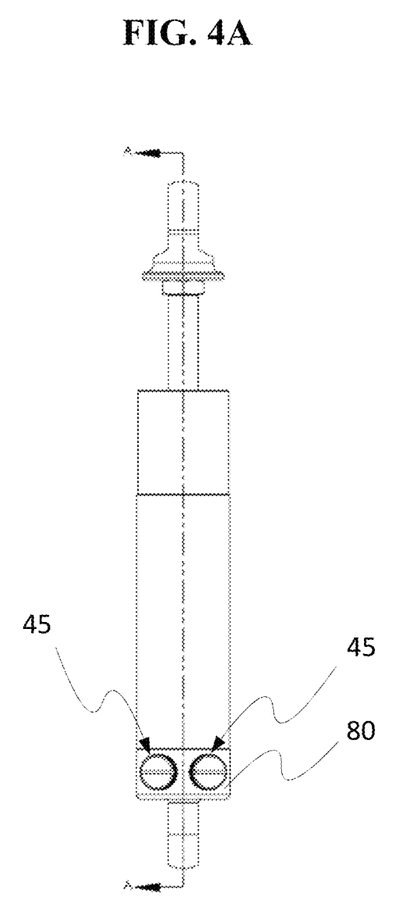
FIG. 4A generally illustrates a front view of an embodiment of a shock absorber having multiple adjustment controls.
Figure 4B:
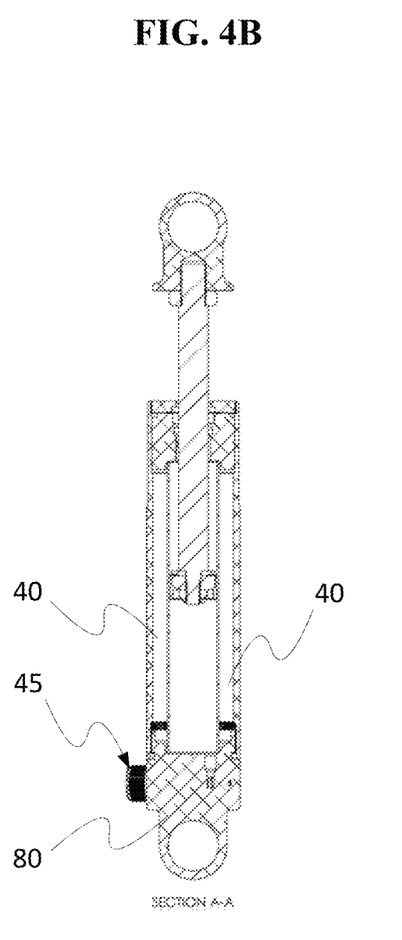
FIG. 4B generally illustrates a cross-sectional view of an embodiment of a shock absorber having multiple adjustment controls.

Although FIGS. 1-3 generally illustrate the use of a single adjustment control 45, in some embodiments there may be multiple adjustment controls 45. For example, as shown in FIGS. 4A-4B a first adjustment control 45 may be coupled to the rebound/compression chamber 40 used during compression and another adjustment control 45 may be coupled to the rebound/compression chamber 40 used during rebound (expansion). Adapting the bore 85 in the base 80 of FIGS. 1-3 to accommodate two or more adjustment controls 45 would be readily understood by those of ordinary skill in the art in view of the instant disclosure. As such, further discussion is omitted herein for the sake of brevity. As should be further appreciated, in those embodiments where the adjustment control 45 corresponds only to the rebound (expansion) the compression may be fixed or controlled using any known mechanism. Inversely, in those embodiments where the adjustment control corresponds only to compression the rebound (expansion) may be fixed or controlled using any known mechanism. Further, although in FIGS. 1-3 the plug 75 is shown as having a cylindrical shape, the plug 75 is not limited to this shape and may take any shape. For example, in some embodiments the plug 75 may take a hexagonal, octagonal, conical, or frustoconical shape. As may be appreciated, the use of a conical or frustoconical shape allows fluid to pass through the flow tube 55 of the aperture seat 50 whenever the plug 75 is not fully seated within the flow tube 55. Further, the flow tube 55 may take any shape including, for example, cylindrical, frutoconical, hexagonal, and octagonal.

As should be appreciated, the above adjustment controls can be readily adapted to any known or after developed shock absorber. As such, specific details regarding individual shock absorbers are omitted herein for the sake of brevity. Further, as will be discussed with more detail herein in relation to FIGS. 5-7, the adjustment control 45 may be adapted for use with a remote reservoir fluidly coupled to the shock absorber 10.

Figure 5A:
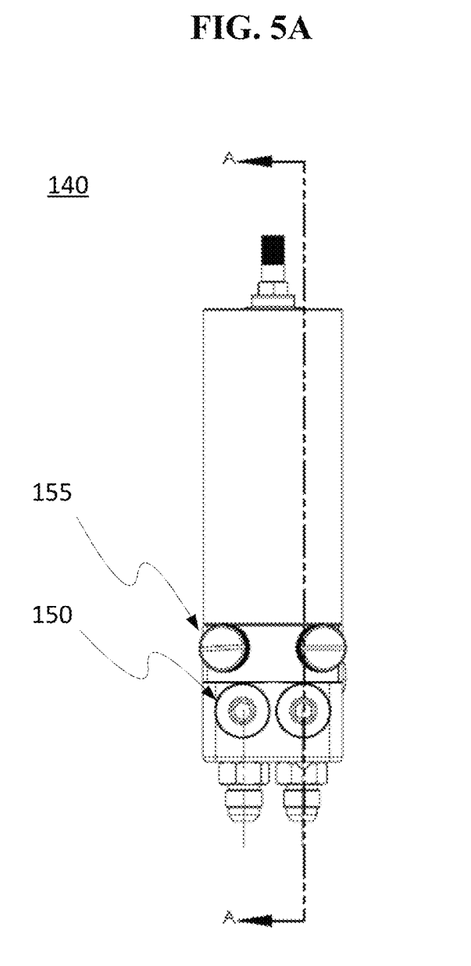
FIG. 5A generally illustrates a front view of an embodiment of a remote reservoir having coarse and fine adjustment controls.
Figure 5B:
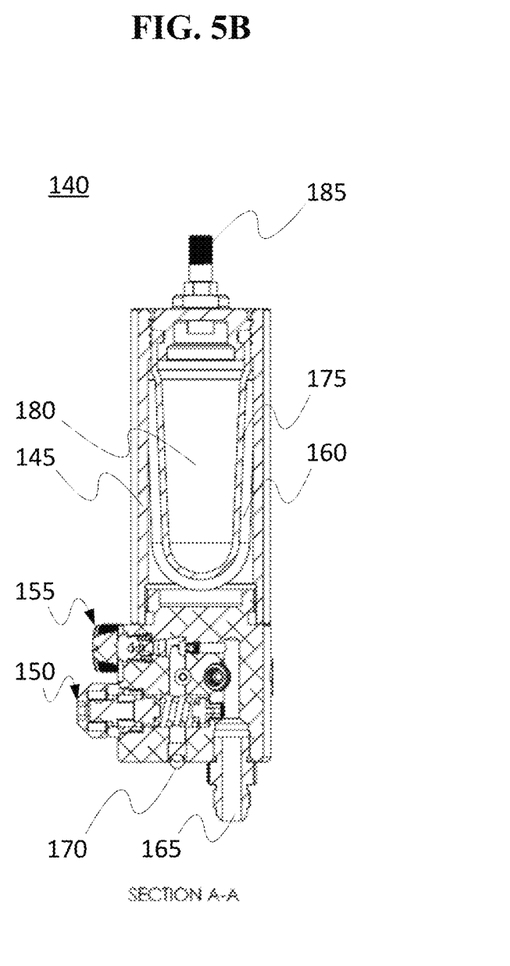
FIG. 5B generally illustrates a cross-sectional view of an embodiment of a remote reservoir having coarse and fine adjustment controls.

A remote reservoir 140 consistent with the present disclosure is generally shown in FIGS. 5A-5B. The remote reservoir 140 includes a coarse adjustment control(s) 150 and a fine adjustment control(s) 155. The adjustment controls 150, 155 regulate the amount of fluid (liquid or gas) that enters a chamber 160 defined by a reservoir body 145. The fluid passes from, for example, the shock absorber 10 through a fluid inlet 165 of the remote reservoir 140 and passes through at least one of the coarse adjustment control 150, the fine adjustment control 155, or the chamber 160. The fluid then exits the remote reservoir 140 through an outlet 170 and returns, for example, to the shock absorber 10.

When the fluid enters the chamber 160 as the shock absorber compresses, it exerts a pressure on a compressible member 175. To resist this pressure, the compressible member 175 forms an interior cavity 180 that is pressurized using a fluid that is received from an inlet valve 185 (e.g., a schrader valve). As such, this pressurization of the interior cavity 180 allows the damping curve to be adjusted. When the pressure of the interior cavity 180 is equalized with the hydraulic pressure of the fluid entering the chamber 160, the fluid proceeds to pass through one or more of the compression adjustment controls 150, 155. As should be appreciated, fluid that passes through at least one of the adjustment controls 150, 155 may bypass the chamber 160. As the shock is extending, the reservoir will have opposite effect by replenishing fluid to the hydraulic system to equalize the pressure while the fluid passes thru one or more of the rebound adjustment controls. By using the adjustment controls 150, 155 the damping curve may be modified while the remote reservoir 140 is in service (i.e., the remote reservoir 140 does not need to be replaced to change the damping curve of the shock absorber 10). It should be appreciated that, in some embodiments, the compressible member 175 may be replaced with a piston.

Figure 6A:
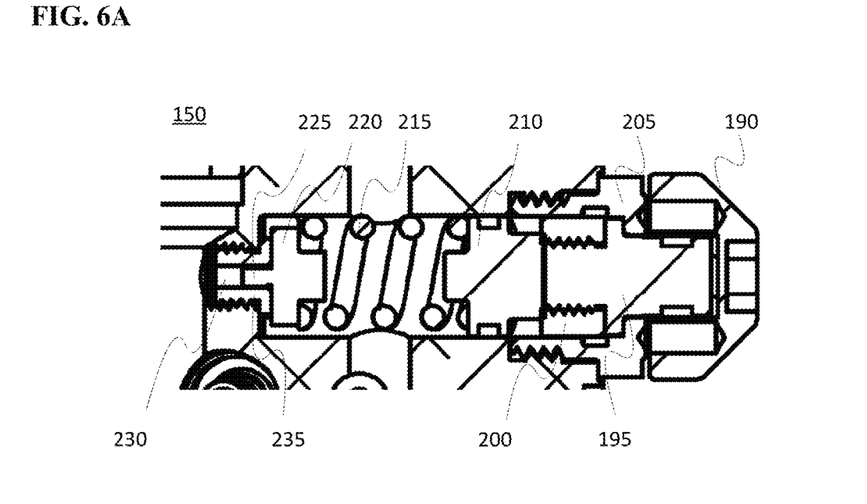
FIG. 6A generally illustrates a cross-sectional view of an embodiment of a coarse adjustment control for a remote reservoir.

As shown in FIG. 6A, one embodiment of the coarse adjustment control 150 includes a coarse adjustment knob 190 coupled to a coarse adjustment nut shaft stud 195. The coarse adjustment nut shaft stud 195 is threadably coupled to a plug nut 200. The plug nut 200 has a non-circular outer surface that engages an interior surface of a cavity within a coarse adjustment nut 205 such that a rotation of the coarse adjustment nut shaft stud 195 causes the plug nut 200 to move axially within the cavity of the coarse adjustment nut 205. As the plug nut 200 moves axially, the plug nut 200 causes an adjuster 210 to engage a spring 215. As the spring 215 is compressed, the spring 215 exerts a force on a plug body 220. The plug body 220 includes a plug 225 that engages a flow tube 230 of a coarse aperture seat 235. The flow tube 230 of the coarse aperture seat 235 is in fluid communication with the fluid inlet 165. As such, when the hydraulic force on the plug 225 exceeds the compressive force exerted by the spring 215, the plug 225 begins to disengage the flow tube 230 of the coarse aperture seat 235. When the plug 225 completely disengages the flow tube 230 of the coarse aperture seat 235 fluid freely passes through the flow tube 230 to the outlet 170. As should be appreciated, the coarse adjustment control 150 is consistent with the teachings described herein with relation to the adjustment control 45 of FIGS. 1-4. As such, further discussion of the course adjustment control 150 is omitted herein for the sake of brevity.

Figure 6B:
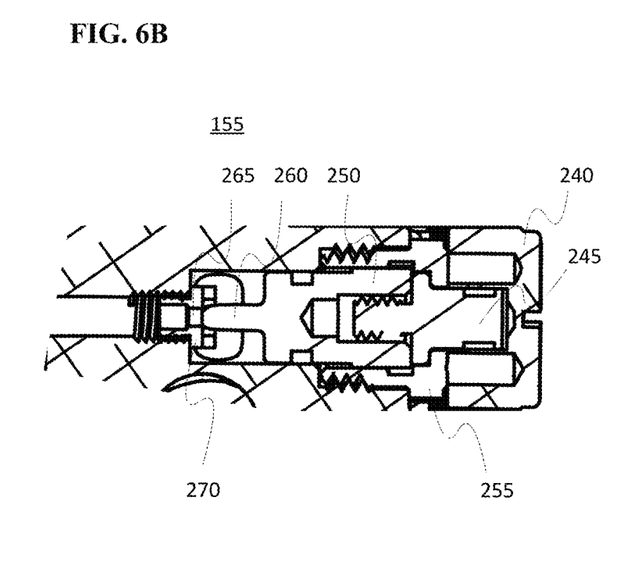
FIG. 6B generally illustrates a cross-sectional view of an embodiment of a fine adjustment control for a remote reservoir.

As shown in FIG. 6B, the fine adjustment control 155 includes a fine adjustment knob 240 coupled to a fine adjustment nut shaft stud 245. The fine adjustment nut shaft stud 245 threadably engages a needle nut 250. The needle nut 250 has a non-circular outer surface that engages a cavity formed from an interior surface of a fine adjustment nut 255 such that a rotation of the fine adjustment nut shaft stud 245 causes the needle nut 250 to move axially within the cavity of the fine adjustment nut 255. As the needle nut 250 moves axially, a needle 260 advances/retracts into/out of a flow tube 265 of a fine aperture seat 270. The needle 260 may have, for example, a cylindrical, a conical, or frustoconical shape. The flow tube 265 of the fine aperture may also take, for example, a cylindrical, a conical, or a frustoconical shape.

Figure 6C:
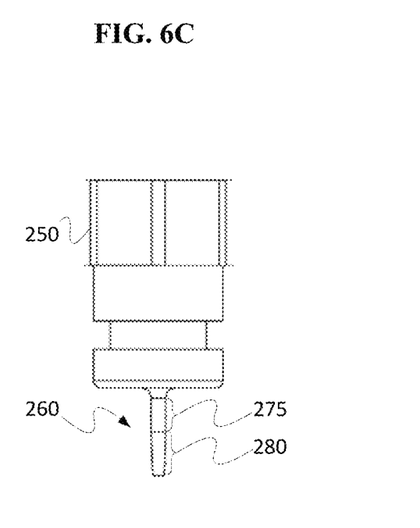
FIG. 6C is a side view of an embodiment of a needle nut having a needle for use in a fine adjustment control.

An example of the needle nut 250 and the needle 260 is generally shown in FIG. 6C. As shown, the needle 260 may have a substantially cylindrical portion 275 and a tapering region 280. However, the needle 260 may have a tapering region 280 that extends the full length of the needle 260. The angle and length of the tapering region 280 serves to control the fluid flow through the flow tube 265 of the fine aperture seat 270 when the needle 260 is within the flow tube 265. As may be appreciated, the needle 260 does not necessarily change its position within the flow tube 265 in response to changes in the hydraulic pressure of the fluid. Although the needle 260 is shown as being integral to the needle nut 250, such a configuration is not required. The needle 260 may be a separate body from the needle nut 250. Further discussion of the use of a needle and needle nut in an adjustment control may be found in U.S. patent application Ser. No. 14/565, 818, filed on Dec. 10, 2014 and entitled Adjustable Damping Curve Shock Absorber, which is incorporated herein by reference.

As should be appreciated, when using both the coarse adjustment control 150 and the fine adjustment control 155 fluid may pass through the flow tube 265 of the fine aperture seat 270 while the plug 225 of the coarse adjustment control 150 is still engaging the flow tube 230 of the coarse aperture seat 235. As such, there is more control over the damping curve, allowing for more control over the characteristics of the shock absorber 10.

Figure 7:
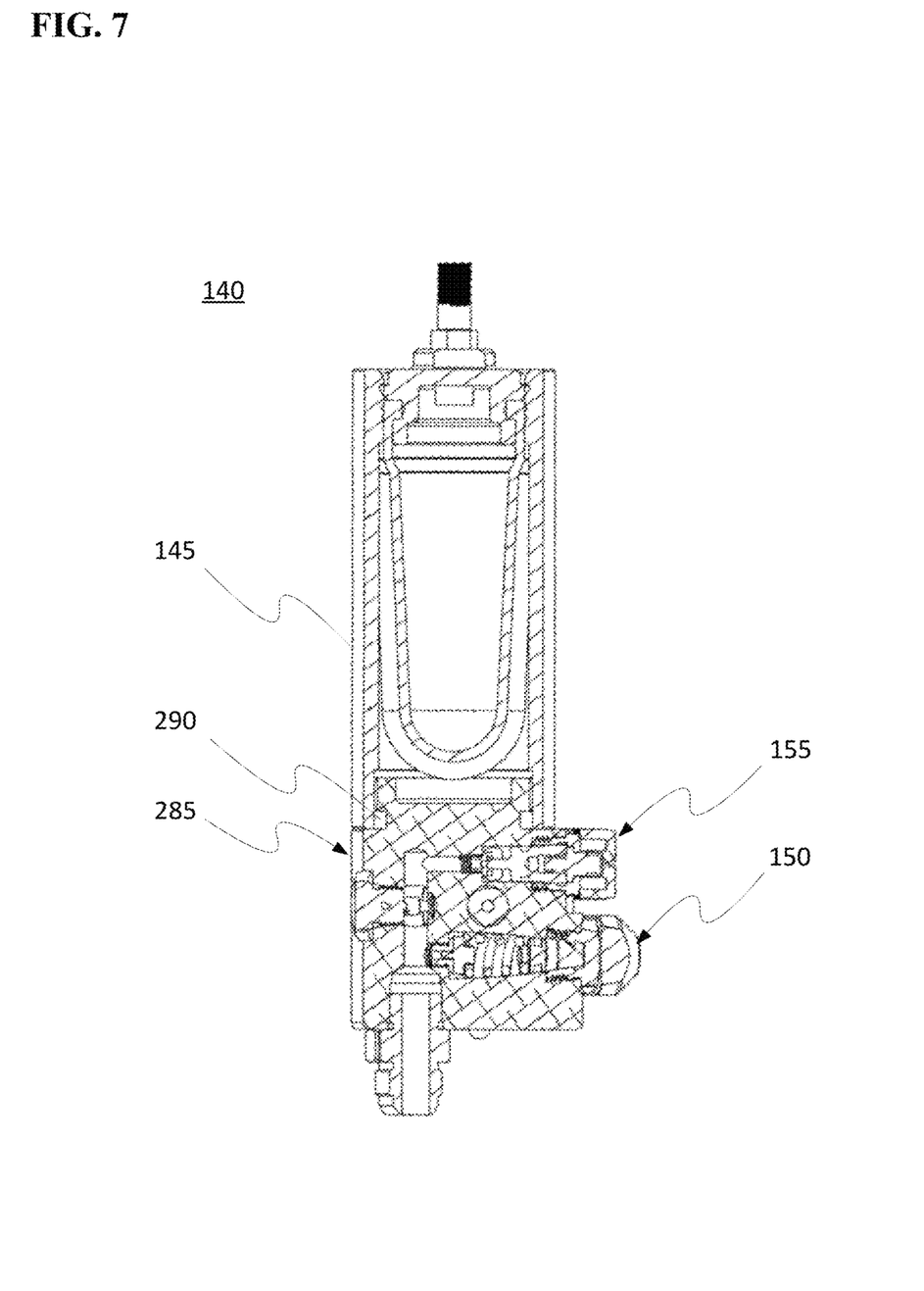
FIG. 7 generally illustrates a cross-sectional view of an embodiment of a remote reservoir having a remote manifold cap that includes a coarse adjustment control and a fine adjustment control.

In some embodiments, as shown in FIG. 7, the adjustment controls 150, 155 may be included in a remote manifold 285.

The remote manifold 285 may be received into the reservoir body 145 of the remote reservoir 140. The remote manifold 285 may be fitted to the remote reservoir using, for example, a friction fit or a threaded connection. A seal 290 may be included between the remote manifold 285 and the reservoir body 145. As may be appreciated, by using the remote manifold 285 the adjustment controls 150, 155 may be replaced without having to replace the remote reservoir 140. For example, the adjustment controls 150, 155 may be replaced with fixed (i.e., non-adjustable) controls or with adjustable controls having characteristics different from those of adjustment controls 150, 155.

As should be appreciated, the coarse adjustment control 150 and the fine adjustment control 155 of the remote reservoir 140 may be applied to any known or after developed remote reservoir. Further, it should be appreciated that the use of both the coarse adjustment control 150 and the fine adjustment control 155, as described herein with relation to the remote reservoir 140, may be used with the shock absorber 10 of FIGS. 1-4.

What is claimed is:

1. An adjustment control for adjusting a damping curve of a shock absorber, said adjustment control comprising:
   an aperture seat coupled to a base of said shock absorber, said aperture seat defining a flow tube and said base having a bore;
   a plug body including a plug, said plug slidably engaging said flow tube;
   a spring in mechanical communication with said plug body, said spring urging said plug into said flow tube;
   a plug nut including a non-circular region and a first threaded portion, said plug nut being in mechanical communication with said spring;
   an adjustment nut shaft stud including a second threaded portion to engage said first threaded portion;
   an adjustment nut coupled to said base, said adjustment nut defining a non-circular cavity to receive at least a portion of said adjustment nut shaft stud and at least a portion of said non-circular region of said plug nut such that said plug nut cannot rotate relative to said non-circular cavity of said adjustment nut; and
   an adjustment knob, wherein rotation of said adjustment knob both clockwise and counter-clockwise causes rotation of said adjustment nut shaft stud relative to said adjustment nut while said adjustment nut remains stationary, and wherein both clockwise and counter-clockwise rotation of said second threaded portion of said adjustment nut shaft stud causes axial movement of said plug nut while said adjustment nut shaft stud remains axially stationary with respect to said flow tube.

2. The adjustment control of claim 1, wherein said aperture seat is removably coupled to said base.

3. The adjustment control of claim 1, wherein a seal is formed at least between said plug and said flow tube.

4. The adjustment control of claim 3, wherein said seal is broken when at least a portion of said plug is outside of said flow tube.

5. The adjustment control of claim 3, wherein said seal is only broken when a distal end of said plug is outside of said flow tube.

6. A shock absorber comprising:
   a shock body defining a piston cavity;
   a shaft including a shock piston moveably disposed within said piston cavity;
   at least one fluid disposed within said piston cavity;
   a base, having a bore, coupled to said shock body; and
   at least one adjustment control to adjust a damping curve of said shock absorber and positioned within said bore, said adjustment control comprising:
      an aperture seat coupled to said base of said shock absorber, said aperture seat defining a flow tube;
      a plug body including a plug, said plug slidably engaging said flow tube;
      a spring in mechanical communication with said plug body, said spring urging said plug into said flow tube;
      a plug nut including a non-circular region and a first threaded portion, said plug nut being in mechanical communication with said spring;
      an adjustment nut shaft stud including a second threaded portion to engage said first threaded portion;
      an adjustment nut coupled to said base, said adjustment nut defining a non-circular cavity to receive at least a portion of said adjustment nut shaft stud and at least a portion of said non-circular region of said plug nut such that said plug nut cannot rotate relative to said non-circular cavity of said adjustment nut; and
      an adjustment knob, wherein rotation of said adjustment knob both clockwise and counter-clockwise causes rotation of said adjustment nut shaft stud relative to said adjustment nut while said adjustment nut remains stationary, and wherein both clockwise and counter-clockwise rotation of said second threaded portion of said adjustment nut shaft stud causes axial movement of said plug nut while said adjustment nut shaft stud remains axially stationary with respect to said flow tube.

7. The shock absorber of claim 6, wherein said base is removably coupled to said shock body.

8. The adjustment control of claim 6, wherein a seal is formed at least between said plug and said flow tube.

9. The adjustment control of claim 8, wherein said seal is broken when at least a portion of said plug is outside of said flow tube.

10. The adjustment control of claim 8, wherein said seal is only broken when a distal end of said plug is outside of said flow tube.

11. A remote reservoir for a shock absorber comprising:
    a reservoir body defining a chamber for at least one fluid;
    a fluid inlet in fluid communication with said chamber, said fluid inlet for receiving said at least one fluid from said shock absorber;
    a fluid outlet in fluid communication with said chamber, said fluid outlet for returning said at least one fluid to said shock absorber;
    a fine adjustment control in fluid communication with said fluid inlet and said fluid outlet, wherein when said at least one fluid passes through said fine adjustment control said at least one fluid bypasses said chamber; and
    a coarse adjustment control in fluid communication with said fluid inlet and said fluid outlet, wherein when said at least one fluid passes through said coarse adjustment control said at least one fluid bypasses said chamber, said coarse adjustment control including:
       a coarse aperture seat coupled to a base, having a bore, of said remote reservoir, said coarse aperture seat defining a coarse flow tube;
       a plug body including a plug, said plug slidably engaging said coarse flow tube;

a spring in mechanical communication with said plug body, said spring urging said plug into said coarse flow tube;

a plug nut including a non-circular region and a first threaded portion, said plug nut being in mechanical communication with said spring;

a coarse adjustment nut shaft stud including a second threaded portion to engage said first threaded portion;

a coarse adjustment nut coupled to said base, said coarse adjustment nut defining a non-circular cavity to receive at least a portion of said coarse adjustment nut shaft stud and at least a portion of said non-circular region of said plug nut such that said plug nut cannot rotate relative to said non-circular cavity of said coarse adjustment nut; and a coarse adjustment knob, wherein rotation of said coarse adjustment knob both clockwise and counter-clockwise causes rotation of said coarse adjustment nut shaft stud relative to said coarse adjustment nut while said coarse adjustment nut remains stationary, and wherein both clockwise and counter-clockwise rotation of said second threaded portion of said coarse adjustment nut shaft stud causes axial movement of said plug nut while said coarse adjustment nut shaft stud remains axially stationary with respect to said coarse flow tube.

12. The remote reservoir of claim 11, wherein said fine adjustment control further comprises:

a fine aperture seat coupled to said base, said fine aperture seat defining a fine flow tube;

a needle nut including a needle extending outwardly towards said fine flow tube from a first end, a non-circular region circumscribing a second end, and a third threaded portion;

a fine adjustment nut shaft stud including a fourth threaded portion to engage said third threaded portion;

a fine adjustment nut coupled to said base, said fine adjustment nut defining a non-circular cavity to receive at least a portion of said fine adjustment nut shaft stud and at least a portion of said non-circular region of said needle nut such that said needle nut cannot rotate relative to said non-circular cavity of said adjustment nut; and a fine adjustment knob, wherein rotation of said fine adjustment knob causes rotation of said fine adjustment nut shaft stud relative to said fine adjustment nut, and wherein rotation of said fourth threaded portion of said fine adjustment nut shaft stud causes axial movement of said needle nut.

* * * * *